United States Patent [19]

Lindner et al.

[11] 4,454,305

[45] Jun. 12, 1984

[54] RUBBER DISPERSIONS II

[75] Inventors: Christian Lindner, Cologne; Lothar Liebig; Karl-Heinz Ott, both of Leverkusen, all of Fed. Rep. of Germany

[73] Assignee: Bayer Aktiengesellschaft, Leverkusen, Fed. Rep. of Germany

[21] Appl. No.: 399,712

[22] Filed: Jul. 19, 1982

Related U.S. Application Data

[63] Continuation of Ser. No. 284,248, Jul. 17, 1981, abandoned, which is a continuation of Ser. No. 129,599, Mar. 12, 1980, abandoned.

[30] Foreign Application Priority Data

Mar. 15, 1979 [DE] Fed. Rep. of Germany ....... 2910168

[51] Int. Cl.$^3$ .............................................. C08F 279/04
[52] U.S. Cl. ..................................... 525/310; 525/316
[58] Field of Search ................................ 525/310, 316

[56] References Cited

U.S. PATENT DOCUMENTS

3,509,237 4/1970 Aubrey ................................ 525/316
4,046,839 9/1977 Papetti ................................ 525/316

*Primary Examiner*—Paul R. Michl

*Attorney, Agent, or Firm*—Connolly and Hutz

[57] ABSTRACT

Stable, free-flowing dispersions in organic liquids of rubbers in the form of discrete particles having an average diameter of from 100 to 3000 nm which contains:

A—as rubber, from 1 to 20% by weight, based on the total dispersion, of a crosslinked diene rubber; B—from 0 to 20% by weight, based on the total dispersion, of water in the form of a water-in-oil emulsion; C—as the continuous organic phase, from 99 to 66% by weight, based on the total dispersion, of (a) $C_1$–$C_{10}$ alkyl acrylates or alkyl methacrylates, methyl methacrylate, ethyl acrylate or n-hexyl acrylate; or (b) a mixture of from 85 to 50% by weight of styrene or α-methyl styrene and from 15 to 50% by weight of acrylonitrile, methacrylonitrile or $C_1$–$C_6$ alkyl acrylates or alkyl methacrylates, methyl methacrylate, ethyl acrylate, n-hexyl acrylate; or (c) a mixture of from 85 to 50% by weight of a $C_1$–$C_{10}$ alkyl acrylate or alkyl methacrylate and from 15 to 50% by weight of acrylonitrile, methacrylonitrile or styrene; up to 60% by weight of a liquid hydrocarbon can be added to and mixed with (a), (b) and (c), and a process for producing said dispersions.

1 Claim, No Drawings

RUBBER DISPERSIONS II

CROSS REFERENCE TO RELATED APPLICATIONS

This application is a continuation of application Ser. No. 284,248 filed July 17, 1981 and now abandoned which in turn is a continuation of application Ser. No. 129,599 filed Mar. 12, 1980 and now abandoned.

This invention relates to stable, free-flowing dispersions of cross-linked, rubbery acrylate polymers in organic liquids and to a process for their production.

Aqueous dispersions (latices) of cross-linked and un-cross-linked acrylate polymers are known and are generally obtained by emulsion polymerisation. However, there are some applications which require stable dispersions of discrete microgel particles of rubber in organic liquids. Such stable organic rubber dispersions cannot be produced directly by the radical polymerisation of appropriate monomers in organic liquids as a continuous rubber network or macrogel, rather than discrete rubber particles, so-called microgel particles, is formed during polymerisation.

The present invention is based on the discovery that aqueous emulsions of cross-linked, rubber-like diene polymers can be dispersed in certain organic liquids so that the diene polymers are dispersed in the form of swollen particles and the water of the original emulsion is also dispersed in the organic liquid (water-in-oil emulsion). If necessary, the water can be removed by selectively breaking the water-in-oil emulsion and subsequently separating off the water mechanically, physically or chemically. For most applications of the organic rubber dispersions according to the present invention, there is no need to remove the water, provided it is present in stable dispersion and should not settle out as a separate phase.

The present invention relates to stable, free-flowing dispersions in organic liquids of rubbers in the form of discrete particles having an average diameter of from 100 to 3000 nm which contain:

(A)—as rubber, from 1 to 20% by weight, based on the total dispersion, of a cross-linked diene rubber;

(B)—from 0 to 20% by weight, based on the total dispersion, of water in the form of a water-in-oil emulsion;

(C)—as the continuous organic phase, from 99 to 60% by weight, based on the total dispersion, of:
 (a) $C_1$–$C_{10}$ alkylacrylates or alkyl methacrylates, preferably methyl methacrylate, ethyl acrylate or n-hexylacrylate; or
 (b) a mixture of from 85 to 50%, by weight, of styrene or α-methyl styrene and from 15 to 50%, by weight, of acrylonitrile, methacrylonitrile, or $C_1$–$C_6$ alkyl acrylates or alkyl methacrylates, for example methyl methacrylate, ethyl acrylate or n-hexyl acrylate; or
 (c) a mixture of from 85 to 50%, by weight, of $C_1$–$C_{10}$ alkyl acrylate or alkyl methacrylate and from 15 to 50%, by weight, of acrylonitrile, methacrylonitrile or styrene;
up to 60%, by weight, of a liquid hydrocarbon may be added to and mixed with (a), (b) and (c).

The present invention also relates to a process for the production of the stable, free-flowing rubber dispersion wherein an aqueous emulsion of a cross-linked diene rubber having an average rubber particle diameter of from 100 to 800 nm (as determined by light scattering) is dispersed with stirring in an organic liquid as the dispersion medium of:

(a) a $C_1$–$C_{10}$ alkyl acrylate or alkyl methacrylate; or
(b) a mixture of from 85 to 50%, by weight, of styrene or α-methyl styrene and from 15 to 50%, by weight, of acrylonitrile or methacrylonitrile or $C_1$–$C_6$ alkyl acrylate or alkyl methacrylate; or
(c) a mixture of from 85 to 50%, by weight, of a $C_1$–$C_{10}$ alkyl acrylate or alkyl methacrylate and from 15 to 50% by weight, of acrylonitrile, methacrylonitrile and/or styrene;

up to 60% by weight, of a liquid hydrocarbon optionally being added to and mixed with (a), (b) and (c), in the presence of from 0.005 to 4% by weight, of a dispersant, and wherein a coagulation agent for the latex is added with continued stirring in a quantity sufficient to break the aqueous latex.

The diene rubbers are in general highly cross-linked. They contain at least 50% by weight, preferably more than 70% by weight, of gel. The rubbers are generally present in the form of aqueous dispersions obtained by emulsion polymerisation, i.e. in the form of latices. They preferably contain as rubbers homopolymers of conjugated dienes containing from 4 to 8 carbon atoms, such as butadiene, isoprene and chloroprene, butadiene being particularly preferred, or copolymers thereof with up to 40% by weight, preferably up to 10% by weight of a vinyl compound, such as acrylonitrile, methacrylonitrile, styrene, α-methyl styrene, halogen substituted styrenes, $C_1$–$C_4$ alkyl styrenes, $C_1$–$C_6$ alkyl acrylates and methacrylates, acrylic acid, methacrylic acid, vinyl sulphonic acid, allyl sulphonic acid, alkylene glycol diacrylates and methacrylates or divinyl benzene.

Liquid hydrocarbons which may be added to the dispersion media (C) are, in particular, aliphatic or aromatic, optionally halogenated, hydrocarbons, for example pentane, hexane, cyclohexane, heptane, low molecular weight paraffin mixtures, benzene, toluene and xylene, or halogen derivatives thereof, for example chloroform, methylene chloride, chlorobenzene, dichlorobenzene and dichloroethylene.

To carry out the process for producing the dispersions, a latex of an acrylate homo- or co-polymer is suspended in one of the above mentioned dispersion media. To this end, generally, from 0.005 to 4=by weight of a dispersant is added to the dispersion medium. Known conventional dispersants can be used, although it is particularly preferred to use acrylic acid esters or methacrylic acid esters, aliphatic ($C_4$–$C_{22}$) alcohols, partial reaction products of maleic acid/α-olefin copolymers and long-chain alkanols, long-chain aliphatic carboxylic acids, resinic acid, high molecular weight alcohols, esters, ethers and/or polyolefins, e.g., dispersion medium soluble polybutadienes. Suspension of the latices in the organic liquids requires vigorous agitation. In general, from 3 to 50 parts, by weight, of latex can be suspended in 100 parts by weight of organic liquid. As the latices generally contain from 30 to 60% by weight, of solids, this means a rubber content of from 1 to 20% by weight in the organic dispersion.

A coagulation agent is then added with stirring to the rubber emulsion suspension in the organic liquid in a quantity which is sufficient to break the aqueous emulsion of the rubber. The coagulation agent is normally used in a quantity of from 2 to 20% by weight, based on the solids content of the aqueous emulsion to be dispersed. The dispersion according to the present invention which, in addition to the dispersed rubber, contains water in the form of a water-in-oil emulsion is, generally, formed either immediately or at the latest after 1 hour at a temperature of from 0° to 100° C., preferably from 20° to 50° C.

If desired, this water may be removed either by selectively breaking the water-in-oil emulsion (e.g., by adding electrolytes, such as acids or bases) and separating off the water as a separate phase or by azetropically distilling off the water immediately without coagulation. The water-containing rubber dispersions according to the present invention have a more or less milky appearance, whilst the water-free rubber dispersions are opaque. The intrinsic viscosity therof may be influenced by acids or bases.

The organic dispersions are largely unaffected by electrolytes, acids or bases. They may be precipitated using large quantities of certain solvents, for example aliphatic alcohols, ketones (for example acetone), acetonitrile and dimethyl formamide.

The dispersions according to the present invention may be polymerised, for example by means of radical initiators or redox initiators, and hardened at room temperatures of from 0° to 150° C. Where the dispersions additionally contain reinforcing fillers, pigments and the like, they may be used for the production of impact-resistant coatings or, for example, as cast resins having specialised properties, such as high resistance to ageing.

EXAMPLES

Production of the aqueous rubber emulsions:

The production of 1,3-diolefin (co)polymer latices by emulsion polymerisation is known.

The following emulsions are used for the dispersion tests (Table 1).

TABLE 1

| Example No. | Type of rubber | Rubber content() of the lactices (%, by weight) gel content (%, by weight)(*) | Latex particle size(*) (nm) | pH |
|---|---|---|---|---|
| 1 | polybutadiene (BR) | 57%, by weight / 88%, by weight | 400 nm | alkaline |
| 2 | polybutadiene (BR) | 60%, by weight / 91%, by weight | 100 nm | alkaline |
| 3 | polybutadiene (BR) | 50%, by weight / 87%, by weight | 800 nm | alkaline |
| 4 | acrylonitrile/ butadiene (NBR) | 49%, by weight / 80%, by weight | 350 nm | neutral |
| 5 | butadiene/ styrene (SBR) | 50%, by weight / 74%, by weight | 300 nm | alkaline |

(*)as measured by light scattering; cf. "Polymeranalytik", M. Hoffmann et al, Georg Thieme Verlag, Stuttgart (1977);
(**)based on the total weight of the emulsion;
(***)based on 100 parts, by weight, of the rubber present in emulsion.

Production of the rubber dispersions according to the present invention:

General procedure:

800 parts, by weight, of an organic medium are stirred with X parts, by weight, of a dispersant. 200 parts, by weight, of the aqueous rubber emulsions (Example 1 to 5) are then added with stirring. Y parts, by weight, of a coagulation agent are then added to the suspension, followed by stirring for Z minutes at room temperature, resulting in formation of the rubber dispersions in organic media (Table 2)

TABLE 2

| Example No. | Rubber emulsion () | Type of organic medium | Type of coagulation agent in Y parts, by weight | Type of dispersant in X parts, by weight, (*) | Stirring time in Z mins. | Rubber particle size (*) in the organic medium (nm) |
|---|---|---|---|---|---|---|
| 6 | 1 | 72%, by weight styrene / 28%, by weight acrylonitrile | 1 acetic acid | 0.2 dispersant A | 10 | 740 |
| 7 | 2 | 72%, by weight styrene / 28%, by weight acrylonitrile | " | " | 10 | 200 |
| 8 | 3 | 72%, by weight styrene / 28%, by weight acrylonitrile | " | " | 10 | 1450 |
| 9 | 4 | 72%, by weight styrene / 28%, by weight acrylonitrile | " | " | 10 | 560 |
| 10 | 5 | 72%, by weight styrene / 28%, by weight acrylonitrile | " | " | 10 | 490 |
| 11 | 1 | 72%, by weight styrene / 28%, by weight acrylonitrile | " | 0.3 dispersant B | 10 | 745 |
| 12 | 1 | 72%, by weight styrene / 28%, by weight acrylonitrile | " | 0.3 dispersant C | 10 | 735 |
| 13 | 1 | 100%, by weight, methyl methacrylate | " | 0.2 dispersant A | 30 | 690 |
| 14 | 1 | 100%, by weight, methyl methacrylate | 2 MgSO$_4$ | " | 30 | 650 |
| 15 | 1 | 100%, by weight, n-butyl acrylate | 1 acetic acid | " | 20 | 730 |
| 16 | 1 | 80%, by weight, styrene / 20%, by weight, t-butyl acrylate | 2 MgSO$_4$ | 0.1 dispersant A | 30 | 690 |

TABLE 2-continued

| Example No. | Rubber emulsion | Type of organic medium () | Type of coagulation agent in Y parts, by weight | Type of dispersant in X parts, by weight, (*) | Stirring time in Z mins. | Rubber particle size (*) in the organic medium (nm) |
| --- | --- | --- | --- | --- | --- | --- |
| 17 | 1 | 61%, by weight, c-hexane 28%, by weight, styrene 10%, by weight, acrylonitrile | 2 acetic acid | 4 dispersant A | 10 | 780 |

(*) determined by light scattering in the case of relatively small particles and by optical microscope in the case of relatively large particles
(**) percentages based on 800 parts, by weight, in the general procedure;
(***) for an explanation of the dispersants, see Table 3.

TABLE 3

| Dispersants used in Table 2 |
| --- |
| Type |
| A = Reaction products of maleic acid anhydride-1-olefin copolymers with higher alkanols (cf. G. Sackmann et al, Angew.Makromol.Chemie 69 (1978), No. 1041, pages 141–156); |
| B = polydecyl methacrylate; |
| C = disproportionated abietic acid |

We claim:

1. A stable, free-flowing dispersion of rubber in an organic liquid in the form of discrete particles having an average diameter of from 100 to 300 nm which contains:
(A) as rubber, from 1 to 20% by weight, based on the total dispersion, of a cross-linked rubber selected from the group consisting of homopolymers of conjugated dienes containing from 4 to 8 carbon atoms and copolymers thereof with up to 40% by weight of a polymerizable vinyl compound;
(B) from 0 to 20% by weight, based on total dispersion, of water in the form of water-in-oil emulsion, and
(C) as the continuous organic phase, from 99 to 66% by weight, based on the total dispersion, of
(a) a mixture of from 85 to 50% by weight of styrene or α-methyl styrene and from 15 to 50% by weight of acrylonitrile or methacrylonitrile or
(b) a mixture of from 85 to 50% by weight of $C_1$–$C_{10}$ alkyl acrylate or alkyl methacrylate and from 15 to 50% by weight of acrylonitrile or methacrylonitrile and
up to 60% by weight of a liquid hydrocarbon added to and mixed with (a) or (b).

* * * * *